United States Patent [19]
Lerner et al.

[11] 3,714,355
[45] *Jan. 30, 1973

[54] MEDAZEPAM AND PROPANTHELINE COMPOSITION

[75] Inventors: Irwin Lerner, West Caldwell; Robert Paul McGrath, Wayne, both of N.J.

[73] Assignee: Hoffman-La Roche, Inc., Nutley, N.J.

[ * ] Notice: The portion of the term of this patent subsequent to Oct. 24, 1989, has been disclaimed.

[22] Filed: May 6, 1971

[21] Appl. No.: 141,034

[52] U.S. Cl.................................424/244, 424/283
[51] Int. Cl. ...............................................A61k 27/00
[58] Field of Search..............................424/244, 283

[56] References Cited

OTHER PUBLICATIONS

Wilson & Jones, American Drug Index, (1970) p. 332.
Chem. Abst., 66-103922 (1967).

Primary Examiner—Stanley J. Friedman
Attorney—Samuel L. Welt, Jon S. Saxe, Bernard S. Leon, Gerald S. Rosen, R. Hain Swope and William M. Farley

[57] ABSTRACT

Compositions comprising medazepam and propantheline halide, useful in treating gastrointestinal disorders are disclosed.

4 Claims, No Drawings

MEDAZEPAM AND PROPANTHELINE COMPOSITION

DETAILED DESCRIPTION OF THE INVENTION

The present invention relates to compositions which are therapeutically useful in the treatment of gastrointestinal disorders. Examples of gastrointestinal disorders amenable to treatment by the compositions of this invention include peptic ulcer, hyperchlorhydria, ulcerative or spastic colon, "nervous stomach," irritable spastic colon, mucous colitis, duidenitis, gastritis, biliary dyskinesia, pylorospasms, cardiospasm, anxiety or organic disorders of the digestive tract.

The present invention relates more specifically to compositions comprising 7-chloro-2,3-dihydro-1-methyl-5-phenyl-2H-1,4-benzodiazepine, hereinafter referred to as medazepam and (2-hydroxyethyl)diisopropylmethylammonium halide xanthene-9-carboxylate, hereinafter referred to as propantheline halide.

The combination of medazepam or an acid addition salt thereof with a pharmaceutically acceptable acid and propantheline halide has been found to be extremely effective in the therapeutic treatment of gastrointestinal disorders such as peptic ulcer and the like. This superior effectiveness is the result of the complete anticholinergic action of propantheline halide plus the ability of medazepam to effectively relieve the anxiety-tension syndrome often manifest with gastrointestinal disorders of the type described previously.

In addition to the free base of medazepam, any salt thereof with a conventional pharmaceutically acceptable acid, such acid being organic or inorganic in nature, may be utilized in forming the compositions of the present invention. For example, one can use a salt of medazepam with an inorganic acid such as hydrochloric acid, hydrobromic acid, sulfuric acid, nitric acid, phosphoric acid or the like or a salt with an organic acid such as acetic acid, benzoic acid, lactic acid, malic acid, benzene or toluene sulfonic acid, maleic acid, salicylic acid and the like. The preferred salt of medazepam for forming the compositions of the present invention is the hydrochloride.

In formulating the compositions of the present invention, the term propantheline halide indicates a member of the group consisting of propantheline chloride, bromide and iodide with the bromide being preferred.

The compositions of the invention are prepared by mixing together the two active components and, optionally, pharmaceutical adjuvants, and forming the resulting mixtures into suitable oral dosage forms, e.g., pressed or coated tablets. Additionally, the compositions of the present invention can be provided in the form of hard shell capsules. If desired, the compositions of the present invention can be formulated into dosage forms suitable for parenteral administration. The methods and techniques by which these various dosage forms are prepared are the conventional procedures of the art. The applications of such procedures to the compositions of the present invention will be readily apparent to one skilled in the art.

In formulating the compositions of the present invention into the aforementioned dosage forms, one can use, as optional ingredients, any of the various adjuvants or excipients ordinarily employed in formulating pharmaceutical products. Thus, for example, in the formulation of tablets, these optional ingredients include fillers such as coprecipitated aluminum hydroxide-calcium carbonate, dicalcium phosphate, lactose and the like; disintegrating agents such as maize starch; and lubricating agents such as talc, calcium stearate and the like.

The active ingredients of the invention can also be used in rectal suppository form by mixing them with suppository adjuvant materials, e.g., fatty acid esters of glycerine, or glycols, e.g., cocoa butter, propylene glycol monostearate, by techniques well known to the art.

The ratio of active ingredients which comprise the compositions of the instant invention may vary over a considerable range, for example, from about ½ to about 5, preferably from 1 ½ to about 3 parts by weight of propantheline halide for each part by weight of medazepam or salt thereof with a pharmaceutically acceptable acid. A preferred adult dosage of the active ingredients of the present invention constitutes from about 2 mg. to about 15 mg., preferably from about 5 mg. to about 10 mg. of medazepam or a salt thereof with a pharmaceutically acceptable acid and from about 5 mg. to about 30 mg., preferably from about 7 ½ mg. to about 15 mg. of propantheline halide. For example, one or two tablets containing as active ingredients 5 mg. of medazepam hydrochloride and 15 mg. of propantheline bromide would in most therapeutic situations be administered to an adult patient three or four times daily. Smaller dosages are, of course, utilized for children or elderly or debilitated patients. The above ranges are not critical and dosages outside these ranges can be employed since the specific dosages and relative amounts of active ingredients depend upon the condition being treated and the needs of the patient.

The following examples are given to illustrate and not limit the invention.

EXAMPLE 1

The following ingredients were blended together thoroughly to form a premix:

| Ingredient | mg/Tablet |
|---|---|
| Medazepam hydrochloride | 5 mg. |
| Propantheline bromide | 15 mg. |
| Corn starch | 15 mg. |

The premix is then combined and blended with the following ingredients:

| Ingredient | mg/Tablet |
|---|---|
| Microcrystalline cellulose | 60 mg. |
| Lactose | 104 mg. |
| Magnesium stearate | 1 mg. |

Thereafter, the mixture was compressed into tablets, weighing 200 mg. each, utilizing a 15/32 inch flat-faced beveled edge punch. The tablets were sealed and sugar coated by sealing with shellac, subcoating with syrup and dusting powder, coloring and smoothing with syrup and waxing and polishing.

EXAMPLE 2

The process of Example 1 was carried out using the same quantities of ingredients except that 10 mg. of medazepam hydrochloride was utilized in place of 5 mg. and the tablets weighed 205 mg. each.

EXAMPLE 3

The following ingredients were blended thoroughly for about 15 minutes in a suitable container:

| Ingredient | mg/Capsule |
|---|---|
| Medazepam | 5 mg. |
| Propantheline | 7 ½ mg. |
| Lactose | 146 ½ mg. |
| Corn starch | 30 mg. |
| Magnesium stearate | 1 mg. |
| Talc | 5 mg. |

The above blend was then passed through a Fitzpatrick Comminuting Machine and then blended for an additional 5 minutes. The mixture was then filled into hard-shell capsules, each of which contained about 195 mg. of the composition.

EXAMPLE 4

Rectal suppositories were prepared by mixing, heating and shaping the following formulation given in amount per suppository: 5 mg. medazepam hydrochloride, 15mg. of propantheline bromide, 38.45 mg. of white beeswax, 96.1 mg. of polyoxyethylene sorbitan mono-oleate (Tween 80) and 1105.45 mg. of propylene glycol monostearate.

Variations in the process and compositions of the invention can be undertaken by those skilled in the art without departing from either the scope or spirit of the invention.

We claim:

1. A therapeutic composition for the treatment of gastrointestinal disturbances in humans comprising a therapeutically inert factor consisting of a pharmaceutically acceptable carrier and a therapeutically active factor consisting of from about 1½ to about 3 parts by weight propantheline halide and one part by weight of medazepam or a salt thereof with a pharmaceutically acceptable acid.

2. A therapeutic composition according to claim 1 wherein said salt of medazepam with a pharmaceutically acceptable acid is the hydrochloride salt and said propantheline halide is propantheline bromide.

3. A therapeutic composition according to claim 1 in unit dosage form suitable for internal administration wherein each unit dosage form contains 5 mg., medazepam or a salt thereof with a pharmaceutically acceptable acid and 15 mg. of propantheline bromide.

4. A therapeutic composition according to claim 1 in unit dosage form suitable for internal administration wherein each unit dosage form contains 10 mg. medazepam hydrochloride and 15 mg. propantheline bromide.

* * * * *